United States Patent [19]

Trautwein

[11] Patent Number: 5,052,430
[45] Date of Patent: Oct. 1, 1991

[54] VALVE ACTUATOR

[75] Inventor: Wayne L. Trautwein, Belleville, Tex.

[73] Assignee: G. H. Bettis, Industry, Tex.

[21] Appl. No.: 535,556

[22] Filed: Jun. 11, 1990

[51] Int. Cl.⁵ .............................................. F16K 43/00
[52] U.S. Cl. ............................ 137/315; 74/424.8 VA;
74/625; 251/14; 251/267; 251/291; 251/294;
403/324; 403/379
[58] Field of Search .................. 137/315; 251/14, 266,
251/267, 268, 270, 291, 292, 294; 403/324, 378,
379; 74/424.8 VA, 625

[56] References Cited

U.S. PATENT DOCUMENTS

| Re. 15,552 | 3/1923 | Knox . | |
|---|---|---|---|
| 939,933 | 11/1909 | Trautner | 403/378 |
| 965,131 | 7/1910 | Bliss | 403/379 |
| 997,038 | 7/1911 | Brummer . | |
| 1,417,161 | 5/1922 | Fueget et al. | 403/379 |
| 1,658,264 | 2/1928 | Sutton et al. . | |
| 1,727,628 | 9/1929 | Baker . | |
| 1,741,320 | 12/1929 | Lee et al. | 251/294 |
| 1,945,222 | 1/1934 | Ingalls | 251/166 |
| 1,969,798 | 8/1934 | Hultquist . | |
| 1,998,080 | 4/1935 | Gerlich | 251/167 |
| 2,028,696 | 1/1936 | Beckwith | 137/139 |
| 2,048,696 | 7/1936 | Hellan | 251/51 |
| 2,318,010 | 5/1943 | Panish | 74/407 |
| 2,596,532 | 5/1952 | Collidge et al. | 137/139 |
| 2,710,017 | 6/1955 | Carter . | |
| 2,717,759 | 9/1955 | Schofield | 251/130 |
| 3,167,338 | 1/1965 | Troike | 287/119 |
| 3,253,610 | 5/1966 | Dahl et al. | 251/14 |
| 3,290,003 | 12/1966 | Kessler | 251/318 |
| 3,648,718 | 3/1972 | Curran | 137/315 |
| 3,734,134 | 5/1973 | Vogeli | 251/14 |
| 3,842,690 | 10/1974 | Gulick | 251/14 |
| 3,973,791 | 8/1976 | Porta et al. | 285/305 |
| 4,220,270 | 9/1980 | Szadkowski | 251/294 |
| 4,239,178 | 12/1980 | Engel et al. | 251/14 |
| 4,345,516 | 8/1982 | Kolb | 192/114 |
| 4,605,031 | 8/1986 | Grund | 137/315 |
| 4,616,803 | 10/1986 | Schils | 251/14 |
| 4,633,897 | 1/1987 | Effenberger | 137/315 |

FOREIGN PATENT DOCUMENTS 133 of 1915 United Kingdom ................ 251/266

Primary Examiner—George L. Walton
Attorney, Agent, or Firm—Vaden, Eickenroht, Thompson, & Boulware

[57] ABSTRACT

A fluid powered valve actuator is disclosed for a valve having a valve body and a threaded valve stem for connecting to the actuator to be reciprocated along its longitudinal axis to open and close the valve. The actuator includes an actuator housing for attaching to the valve body, a fluid motor mounted on the housing having a cylinder, a piston in the cylinder, and a piston rod having one end attached to the piston. To connect the valve stem to the piston rod, a connecting block having a threaded opening in one end is screwed onto the threads on the valve stem. An opening in the other end of the block receives the end of the piston rod. There are grooves extending transverse the longitudinal axes of the piston rod on opposite sides of the piston rod and grooves in the connecting block on opposite sides of the opening in the block, and openings in the connecting block through which rods can be positioned, with each rod in engagement with a groove in the block and a groove in the rod to connect the connecting block to the piston rod. The piston rod is of tubular construction to allow the valve stem to extend into the rod if required to adjust the stroke of the rod to the valve.

8 Claims, 3 Drawing Sheets

VALVE ACTUATOR

This invention relates to valve actuators, generally, and in particular to hydraulic or pneumatic powered actuators that move the valve to its operating position by moving the valve stem of the valve longitudinally.

Fluid powered valve actuators include a cylinder, a piston that is moved in the cylinder by fluid pressure, and a piston rod that is connected to the valve stem of the valve to allow the fluid motor through the rod to reciprocate the valve stem and open and/or close the valve.

It is an object and feature of this invention to provide apparatus that will quickly and easily connect and disconnect the piston rod and the valve stem.

Another feature and object of this invention is to provide such connecting apparatus that allows the rod and stem to telescope as required to adjust the stroke of the actuator to properly open and/or close the valve.

It is a further object and feature of this invention to provide a valve actuator that allows the valve to be operated manually while the power cylinder of the actuator is removed for repairs or replacement.

These and other objects, advantages, and features of this invention will be apparent to those skilled in the art from a consideration of the specification including the attached drawings and appended claims.

Figure 1:
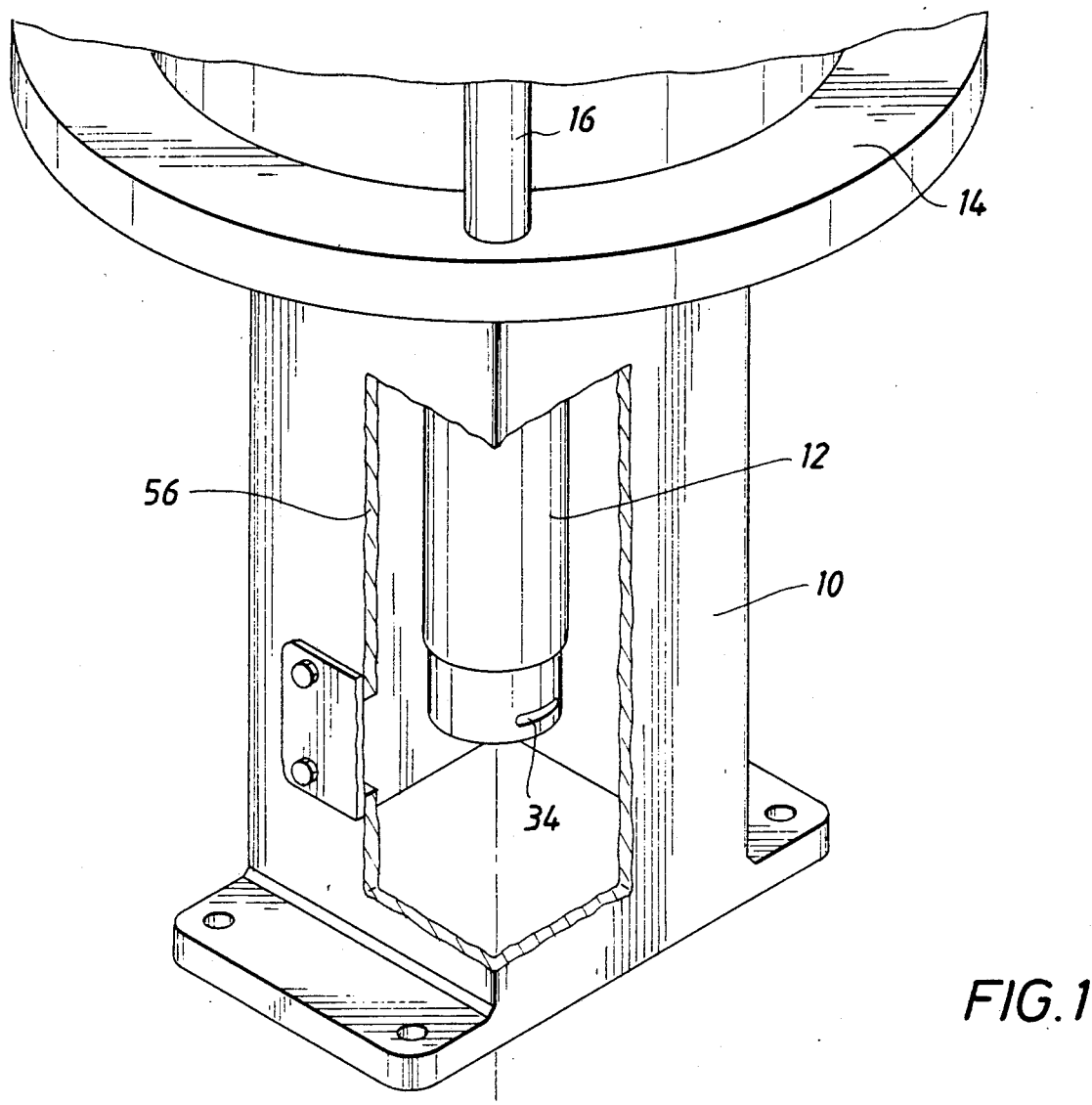
FIG. 1 is an exploded isometric view of the valve actuator, the unique connecting block of this invention, and the upper end of the threaded valve stem of the valve upon which the valve actuator is to be mounted.
Figure 2:
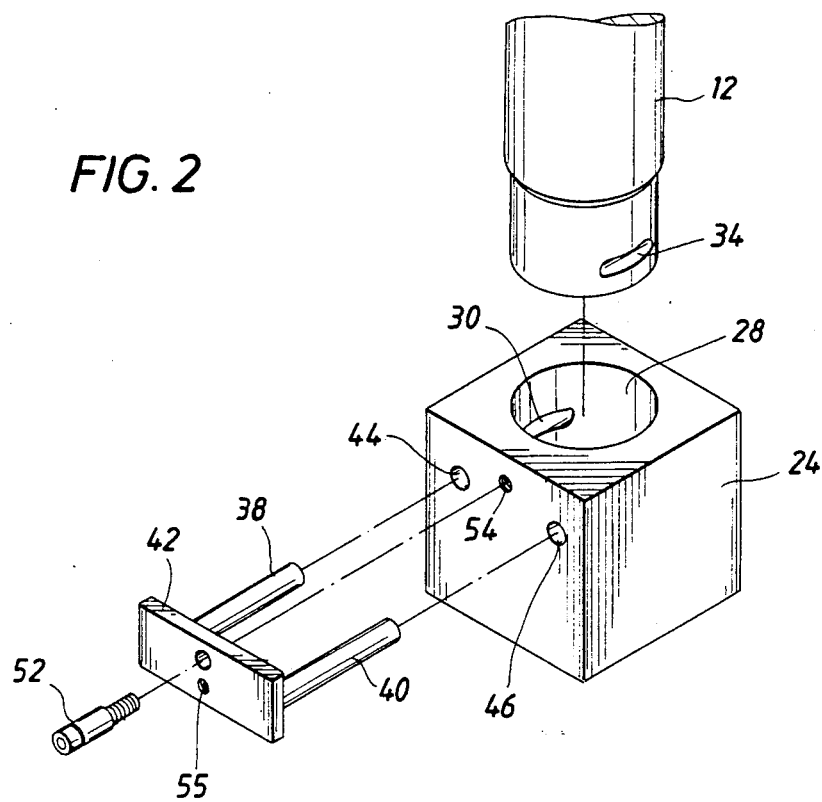
FIG. 2 is an exploded isometric view of the connecting block of this invention illustrating how the piston rod is connected to the connecting block by a pair of pins.
Figure 3:
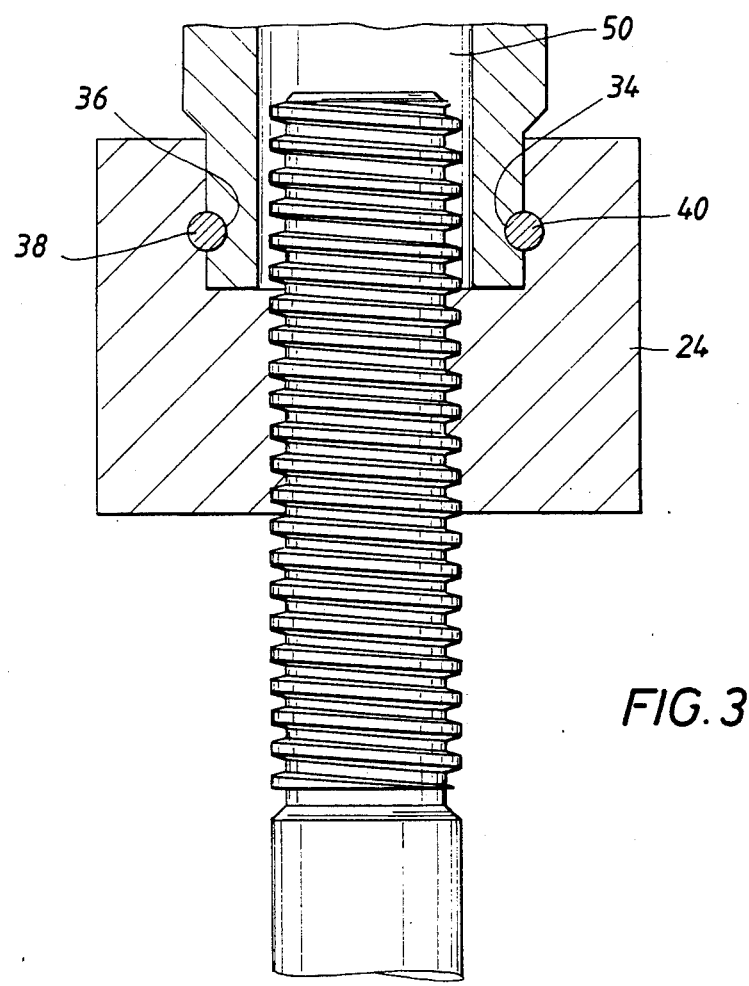
FIG. 3 is a sectional view showing the connecting block connected to the valve stem and to the piston rod of the actuator.

In FIG. 1, housing 10 of the valve actuator is cut away to expose piston rod 12 that is connected to a piston (not shown) in cylinder 14 that is moved by either air or hydraulic fluid under pressure to reciprocate piston rod 12. Cylinder 14 is attached to the top of housing 10 by bolts 16. The actuator is adapted to be mounted on the body of a valve with piston rod 12 in axial alignment with valve stem 22. Connecting block 24 is designed to connect the piston rod to the valve stem. For this purpose, it is provided with threaded opening 26 having threads that mate with the male threads on valve stem 22, as shown in FIG. 3. The block is also provided with opening 28 of enlarged diameter into which hollow piston rod 12 can extend, also as shown in FIG. 3. To connect the piston rod to block 24 and through the block to the valve stem, opening 28 in the block is provided with grooves 30 and 32 that mate with grooves 34 and 36 on the outside surface of the valve stem to form an opening to receive pins 38 and 40. The pins are mounted on plate 42 to hold them in parallel spaced alignment so that they will move through openings 44 and 46 in block 24 and then into engagement with the grooves in the side of opening 28 and the side of piston rod 12 to anchor the piston rod to the block. By connecting the rod to the connecting block in this manner, longitudinal bore 50 of the piston rod is unobstructed. This allows valve stem 22 to move upwardly or downwardly relative to block 24 in order to adjust the stroke of the actuator to the particular valve upon which it is mounted.

With this arrangement, the actuator can be quickly and easily connected and disconnected to the valve stem. This is done by first mounting connecting block 24 on the valve stem. Then the actuator, including housing 10 and piston rod 12 can be lowered into position where the actuator housing can be connected to the body of the valve and the piston rod is connected to block 24 by pins 38 and 40.

Threaded pin 52 extends through opening 53 in plate 42 and is screwed into tapped hole 54 in lock 24 to extend outwardly through slot 56 (FIG. 4) to indicate the position of the valve stem relative to the housing.

Figure 4:
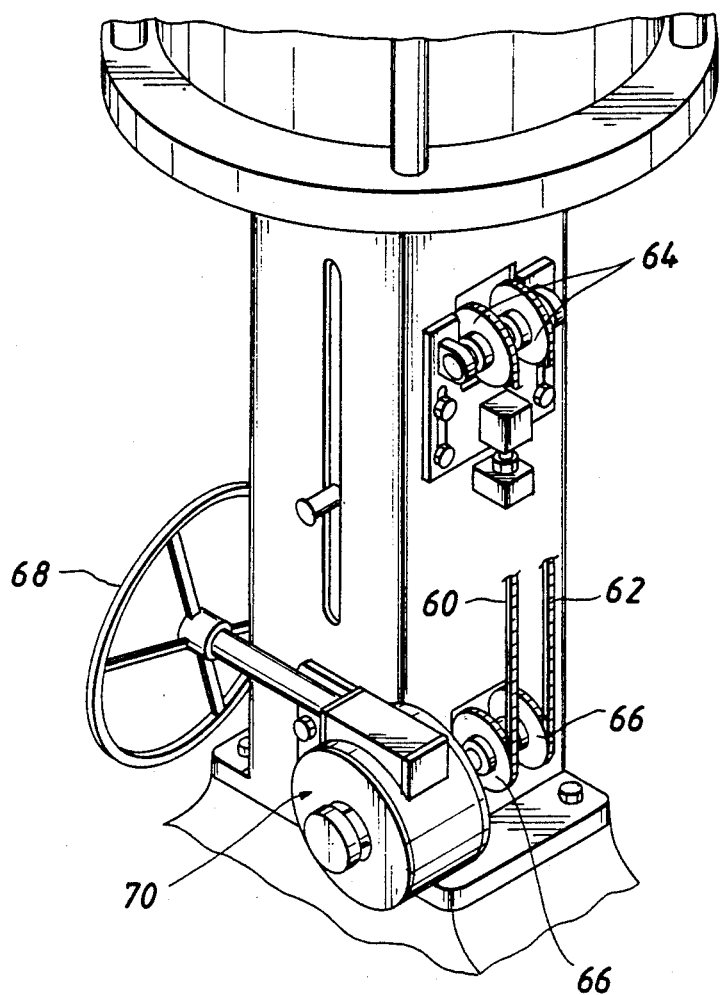
FIG. 4 is an isometric view of the actuator with the means mounted on the actuator for manually opening and closing the valve when the fluid motor of the actuator is either removed for repair or replacement or is not operative for some reason or another.
Figure 5:
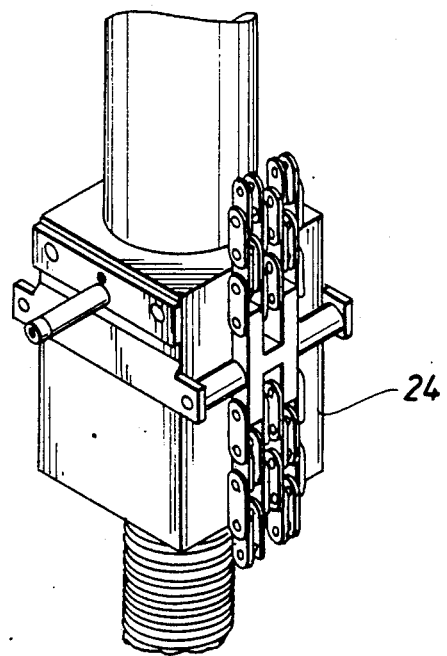
FIG. 5 is an isometric view of the connecting block mounted on the valve stem and connected to the roller chains for moving the valve stem manually.

In the embodiment shown in FIGS. 4 and 5, means are shown for manually opening and closing the valve when the fluid cylinder of the actuator is inoperative for one reason or another. The apparatus includes a pair of roller chains 60 and 62 that extend over upper sprockets 60 and lower sprockets 66 with their ends connected to connecting block 24 as shown in FIG. 5. The lower sprockets are rotated by handwheel 68 through a worm and gear arrangement located in gear box 70. Thus, when it is desired to manually move the valve to another position, rotation of handwheel 68 will cause block 24 and the valve stem to move up or down depending upon the direction of rotation of the handwheel. This arrangement allows the fluid cylinder of the actuator to be removed and repaired or replaced and yet the valve can be operated manually so that the process in which the valve is being used can continue without interruption. Before the cylinder is removed, of course, the piston rod will need to be disconnected from block 24 by removing pins 38 and 40. To assist in doing this, pin 52 is unscrewed from tapped hole 54 and screwed into tapped hole 55 in plate 42 to provide a handle for pulling on the plate and the pins.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A fluid powered valve actuator for a valve having a valve body and a threaded valve stem for connecting to the actuator to be reciprocated along its longitudinal axis to open and close the valve, said actuator comprising an actuator housing for attaching to the valve body, a fluid motor mounted on the housing having a cylinder, a piston in the cylinder, and a piston rod having one end attached to the piston, means for attaching the other end of the piston rod to the valve stem to allow the fluid motor to reciprocate the valve stem and open and close the valve, said connecting means including a unitary connecting block having a threaded opening in one end to connect the block to the threads on the valve stem, a non-threaded opening in the other end to receive the end of the piston rod, grooves extending transverse the longitudinal axes of the piston rod and being disposed on opposite sides of the piston rod, and grooves being disposed in the connecting block on opposite sides of the opening in the block, and openings in the connecting block through which retaining rods can be positioned with each rod being in engagement with one of the grooves in the block and one of the grooves in the rod to connect the connecting block to the piston rod, said valve stem being adjustable within said block as required to adjust the stroke of the actuator to properly open and close the valve.

2. The actuator of claim 1 in which the threaded opening is connected to and is smaller in diameter than the opening in which the piston rod is located and the piston rod has a longitudinally extending opening into which the valve stem may extend as the position of the connecting block on the threaded valve stem is adjusted.

3. The actuator of claim 1 further provided with a sheave mounted on the housing on one side of the connecting member, a sprocket mounted on the housing on the opposite side of the connecting member, a flexible member extending over the pulley and the sprocket with its ends connected to the connecting block, and a hand wheel for rotating the sprocket to reciprocate the connecting block and the valve stem to open and close the valve when the fluid motor is inoperative or when the fluid motor and piston rod have been removed for repair or replacement.

4. The actuator of claim 3 in which the flexible member is a roller chain.

5. A fluid powered actuator for a valve having a valve body and a threaded valve stem that is reciprocated along its longitudinal axis to open and close the valve, said actuator comprising an actuator housing for attaching to the valve body, a fluid motor mounted on the housing having a cylinder, a piston in the cylinder and a piston rod having one end attached to the piston, connector means for connecting the other end of the piston rod to the valve stem to allow the fluid motor to reciprocate the valve stem and open and close the valve, said connecting means including a unitary connecting block having a threaded opening in one end to connect the block to the threads on the valve stem, a non-threaded opening in the other end to receive the end of the piston rod, grooves extending transverse the longitudinal axes of the piston rod and being disposed on opposite sides of the piston rod, and grooves being disposed in the connecting block on opposite sides of the opening in the block, and openings in the connecting block through which retaining rods can be positioned with each rod being in engagement with one of the grooves in the block and one of the grooves in the rod to connect the connecting block to the piston rod, said valve stem being adjustable within said block as required to adjust the stroke of the actuator to properly open and close the valve, a pair of sheaves mounted for rotation on axles mounted on the adapter housing in spaced relationship along a line parallel to the longitudinal axis of the valve stem, an elongated flexible member engaging the sheaves with the ends of the member connected to the connecting member, and means to rotate one of the sheaves to reciprocate the valve stem and open and close the valve when the fluid motor is inoperative or the fluid motor and piston rod have been removed for repair or replacement.

6. The actuator of claim 5 in which the flexible member is a roller chain and one of the sheaves is a sprocket.

7. The actuator of claim 5 in which the means to rotate one of the sheaves is a handwheel.

8. The actuator of claim 5 in which the threaded opening is connected to and is smaller in diameter than the opening in which the piston rod is located and the piston rod has a longitudinally extending opening into which the valve stem may extend as the position of the connecting block on the threaded valve stem is adjusted.

* * * * *